March 29, 1932. A. W. KEGLER 1,851,255

SPRAYER

Original Filed Feb. 20, 1924 2 Sheets-Sheet 1

Inventor
Anton W. Kegler
By his Attorneys

March 29, 1932. A. W. KEGLER 1,851,255
SPRAYER
Original Filed Feb. 20, 1924  2 Sheets-Sheet 2
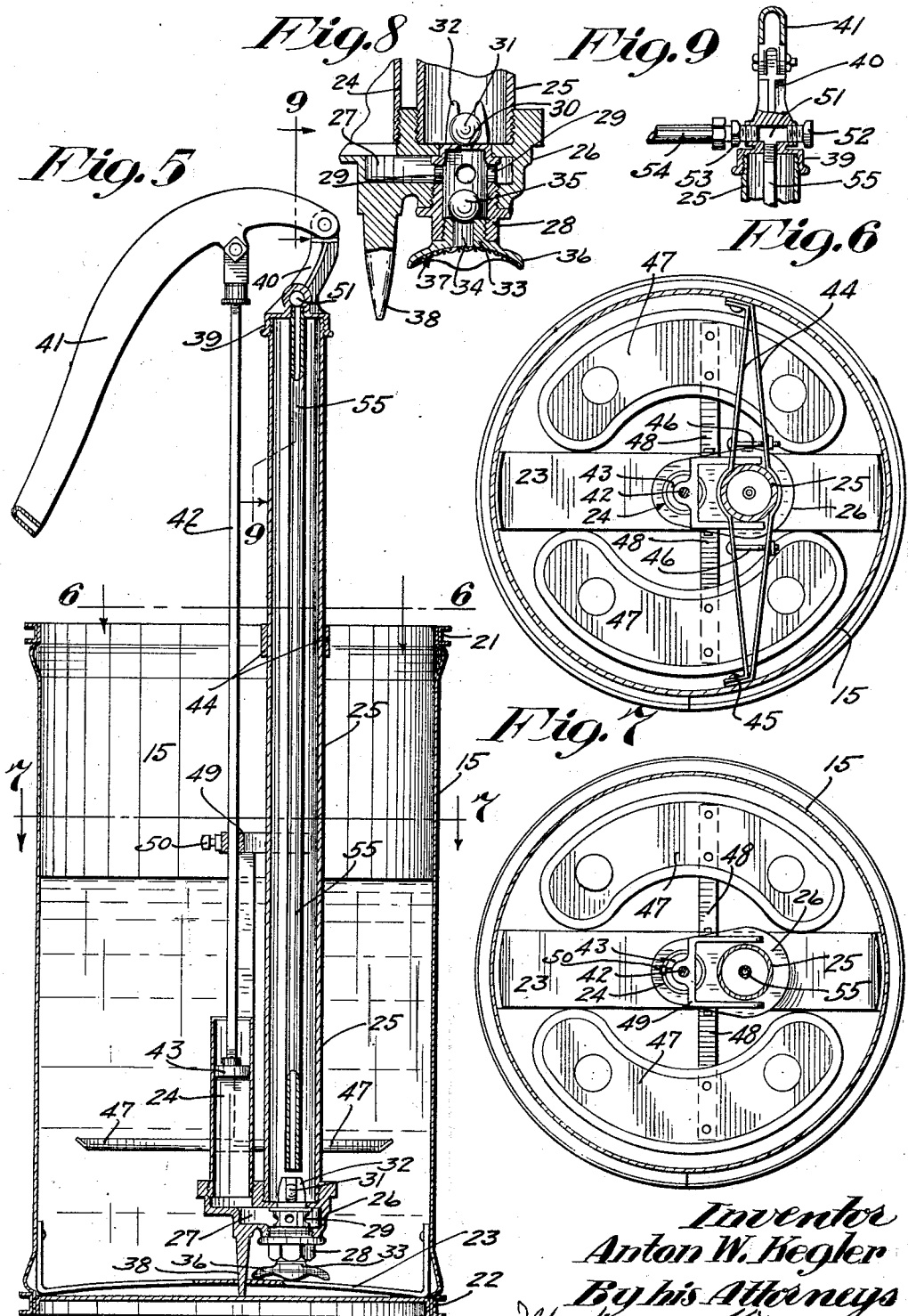
Inventor
Anton W. Kegler
By his Attorneys Patented Mar. 29, 1932

1,851,255

UNITED STATES PATENT OFFICE

ANTON W. KEGLER, OF MINNEAPOLIS, MINNESOTA, ASSIGNOR TO H. D. HUDSON MANUFACTURING COMPANY, OF MINNEAPOLIS, MINNESOTA, A CORPORATION OF MINNESOTA

SPRAYER

Application filed February 20, 1924, Serial No. 694,019. Renewed April 28, 1928.

My invention provides an improved sprayer adapted for very general use but especially designed and particulary adapted to be used for spraying poisonous liquids or liquid germicides in orchards and gardens. In the design illustrated in the drawings, the sprayer is particularly intended to meet the requirements of the small orchardist, gardener and fruit grower, whose needs demand something larger than a knapsack sprayer but do not require a sprayer as large and as expensive as a horse-propelled or operated outfit. Hence, the present sprayer is mounted and arranged to be wheeled about on the plan of a wheel-barrow, on which the various devices, such as the liquid supply tank, pressure tank pump, and cooperating devices are mounted.

In the accompanying drawings, which illustrate the invention, like characters indicate like parts throughout the several views.

Referring to the drawings:

Fig. 5 is an enlarged vertical section taken approximately on the line 5—5 of Fig. 2, some parts being shown in full;

Fig. 6 is a horizontal section on the line 6—6 of Fig. 5;

Fig. 7 is a horizontal section on the line 7—7 of Fig. 5;

Fig. 8 is a fragmentary vertical section taken on the same line as Fig. 5 and showing particularly the pump valve mechanism; and Fig. 9 is a fragmentary section on the line 9—9 of Fig. 5.

Figure 1:
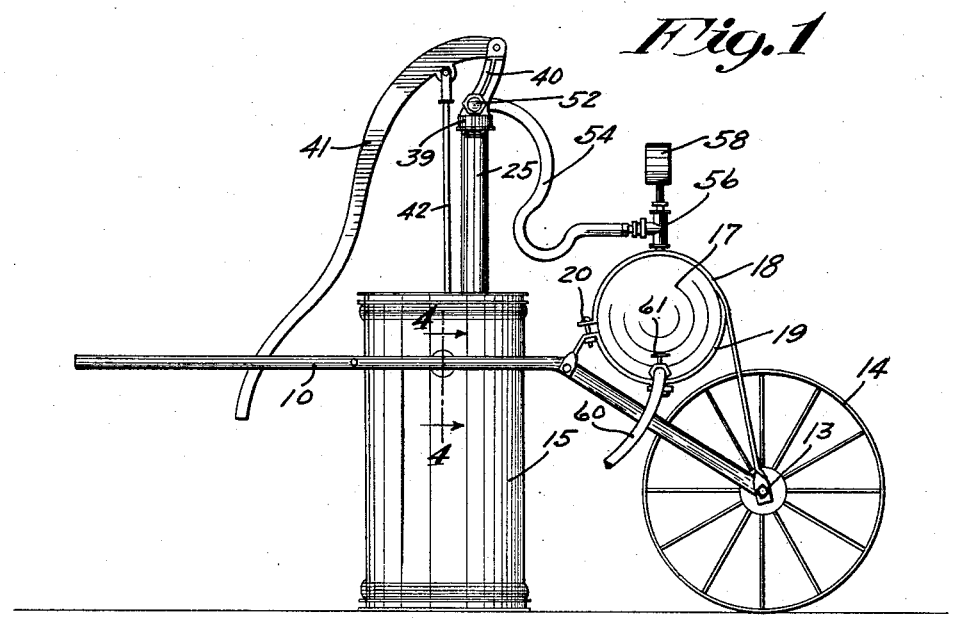
Fig. 1 is a side elevation showing the complete spraying device.
Figure 2:
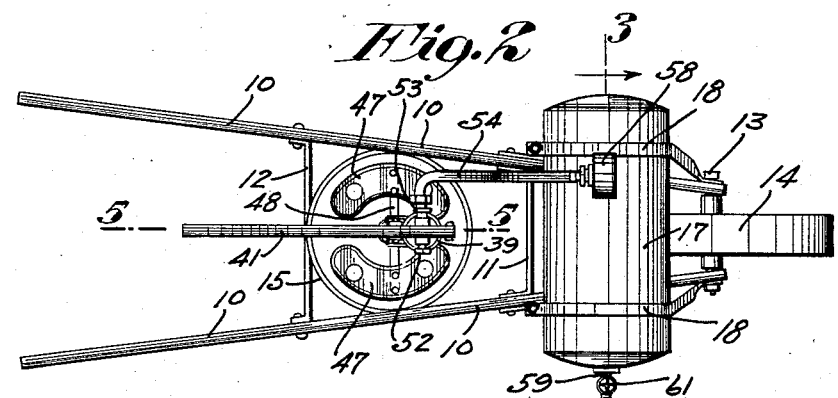
Fig. 2 is a plan view of the same.
Figure 3:
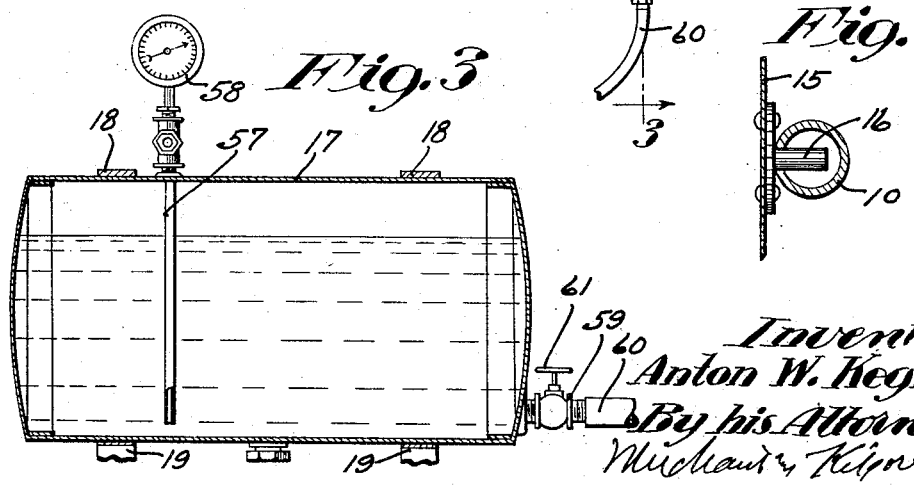
Fig. 3 is a transverse vertical section taken approximately on the line 3—3 of Fig. 2.
Figure 4:
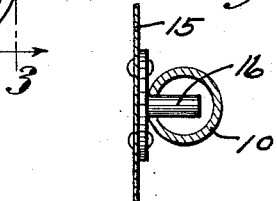
Fig. 4 is a detail in section on the line 4—4 of Fig. 1.

The frame of the wheelbarrow structure comprises a pair of forwardly converging handle bars 10, (preferably metal tubes), spaced apart but rigidly connected by transverse metal tie straps 11 and 12 and provided at their front ends with a transverse axle bolt 13 on which a wheel 14 is journaled.

The spraying liquid, in a considerable quantity, say fifteen or twenty gallons, is carried in an open tank 15, to wit: a tank that is subject to atmospheric pressure. This tank is preferably an upright cylindrical tank with an open top and provided at its sides with diametrically opposite rigidly secured outstanding trunnions 16 that fit perforations on the inner sides of the handle bars 10.

The trunnions 16 are located far above the center of gravity of the tank 15, so that the latter will be swung with a pendulum action always to a vertical or upright position. When the handle bars are lowered, the bottom of the tank 15 will rest upon the ground and when the handle bars are lifted in the act of wheeling the device about, the bottom of the tank will, of course, be raised clear of the ground. Said tank is mounted as described in the space between the front and rear tie straps 11 and 12.

Located on the forward portions of the handle bars 10 is a quite large closed pressure tank 17. This tank is preferably of cylindrical form and disposed horizontally and transversely above the handle bars 10. To carry the tank 17 in the position just noted, it is clamped between the approximately semi-cylindrical portions of saddle straps 18 and 19 arranged to be drawn together by small nut-equipped bolts 20. The lower ends of the saddle straps 19 are bolted, riveted or otherwise rigidly secured to the intermediate portions of the handle bars 10, while the lower ends of the straps 18 are connected to the front ends of said handle bars by the axle bolt 13.

Preferably, the supply tank 15 is made of comparatively light sheet metal and is reinforced at its upper and lower edges by light channel bar bands 21 and 22. Extended diametrically across the bottom of the tank but bowed above the same is a quite heavy anchor bar 23, preferably of flat sheet metal, having upturned ends riveted or otherwise rigidly secured to the sides of the tank.

Located within the supply tank is a removable self-contained structure that comprises a pump, a pressure equalizing chamber, an agitator, and certain cooperating devices. This self-contained structure includes an upright pump cylinder 24, an upright pressure equalizing tube 25, and a common base casting 26 into which the lower ends of the two elements 24 and 25 are screwed with liquid-tight joints. The lower end of the pump cylinder 24 is connected to the lower end of the equalizing tube 25 through an air passage 27, but this communication is controlled through a pump valve mechanism of novel construction and which, as shown in Figs. 5 and 8, includes a tubular valve casing 28, axially aligned with the equalizing tube 25, extended through the air passage 27 and having screw-threaded engagement with the lower portion of the base 26. This valve casing 28 cuts off communication between the pump cylinder and equalizing tube except through ports 29 and 30 formed in said casing. The ports 29 are always open but the axial port 30 is normally closed by a valve-acting check ball 31 that is kept in operative relation to said port by circumferentially spaced retaining fingers 32 shown as cast integral with and rising from the upper end of said valve casing. Screwed into the lower end of the valve casing 28 is a plug 33 having an axial intake port 34 that is normally closed by a valve-acting check ball 35 loosely seated thereon and caged within the valve casing. The plug 33 is shown as provided with circumferentially spaced and radially projecting bearing lugs 36 that may rest on the anchor bar 23 without closing the port 34. The port 34 is preferably covered by a wire gauze 37 that prevents undissolved portions of the poisonous or insect-destroying solids from getting into the pump and, hence from clogging up the operating nozzle. To anchor the base casting 26 at the bottom of the the tank and thus hold the pump cylinder and the lower end of the equalizing tube 25 stationary and properly positioned, said base casting 26 is provided with a depending anchoring pin or finger-like extension 38 that is detachably seated in a perforation formed in said anchor bar 23.

The equalizing tube 25 is extended high above the top of the tank 15 and the upper end thereof is closed by a cap 39 having an extended arm 40 to which a pump handle 41 is pivoted. This pump handle 41 operates a pump rod 42, to the lower end of which is attached a pump piston 43 that works within the pump cylinder 24.

The upper portion of the equalizing tube 25 is rigidly held by a trussed cross bar, which, as an important feature, is made up of two metal straps, such as flat steel bars 44. At their ends, the straps 44 are bent laterally to form overlapped end flanges that are rigidly secured to the sides of the tank by small nut-equipped bolts 45, which, in the arrangement shown, are also passed through the upper reinforcing band 21. The central portions of the straps 44 are concavely bent to fit the opposite sides of said tube 25 and on opposite sides of said tube nut-equipped bolts 46 are passed through the straps, as best shown in Fig. 6. When the bolts 46 are tightened, the straps 44 will not only be drawn tightly against the equalizing tube 25 but the straps will be drawn closer together, thereby decreasing the angle of the one in respect to the other and producing an endwise extension of the composite bar that tightly clamps the ends thereof against the sides of the tank.

The bar 44 may be readily detached from the tank, and when it is detached, the pump structure, including the equalizing chamber 25 and the other parts mounted thereon, may be readily removed from the tank simply by lifting the anchoring pin 38 out of its seat in the anchor bar 23.

To keep the liquid agitated so that the solid particles will not settle to the bottom of the tank 15, the pump is equipped with an agitator, which, as shown, comprises a pair of perforated segmental agitating blades 47 connected to the lower ends of a pair of legs 48 that depend from a forked bracket 49 that loosely embraces the equalizing tube 25 and is rigidly but adjustably secured to the pump rod 42 by a set screw 50.

The cap 39, which closes the upper end of the equalizing tube 25, is formed with an outlet passage 51, (see Figs. 5 and 9), which, at one side, is shown as closed by a plug 52 and at the other side is connected by a nipple 53 to a liquid-delivery tube 54. Extended axially upward through the equalizing tube 25 from a point slightly above the lower end thereof is a liquid-receiving tube 55, the upper end of which is tightly screwed into the cap 39 and delivers to the passage 51 of said cap.

The liquid delivery tube 54 is a flexible hose so that it permits the supply tank to freely move in respect to the pressure tank 17, and said tube is, as shown, connected to a T-coupling 56 that is applied to the upper end of a metal pipe or tube 57 that is extended downward through the top of the tank 17 and terminates quite close to the bottom thereof. The numeral 58 indicates a pressure gauge shown as connected to the T-coupling 56. It will be noted that the pipe 57 delivers the liquid quite close to one end of the tank 17 and it will now be noted that said tank is provided at its opposite end and at or near its bottom with a discharge nipple 59 to which a delivery hose 60 is attached. This hose 60 will be of any desired length and at its extended end will be provided with a suitable spraying head or atomizer, not shown and the construction of which is not important to the present case. The nipple 59 is shown as provided with a valve 61 that will, of course, be opened when the spraying device is to be used.

When the spraying liquid is first placed in the supply tank 15 and before the pump has been operated, there will be no liquid either in the equalizing tube 25 or in the pressure tank 17. When the pump is operated, the liquid will be drawn into the pump cylinder under up-strokes of the pump piston and will be forced into the equalizing tube 25 under downward movements of the pump piston. As the liquid is forced into the equalizing tube, the air confined in said equalizing tube above the liquid will be put under higher and higher compression until the pressure is sufficient to force liquid upward through the tube 55 and through the passage 51 and tubes 54 and 57 into the pressure tank 17. Under continued operation of the pump, the liquid will be caused to accumulate and rise in altitude within the equalizing tube 25 and pressure tank 17, and under such action, the air in the upper portion of said equalizing tube and in the upper portion of said pressure tank will be put under higher and higher pressure, and this pumping action may be continued until the air pressure makes further operation of the pump a very difficult matter. The pressure of air in the upper portions of the equalizing tube and pressure tank will be equalized, but under rapid pumping action, the air confined in the equalizing tube will first be compressed and will operate to produce the delivery of liquid into the pressure tank required to again equalize the increasing pressure. The equalizing tube 25, therefore, acts as a sort of auxiliary or supplemental reservoir interposed between the pump and pressure tank and it adds its air-holding capacity to that of the pressure tank.

When the operating tube 60 is opened, the air pressure in the pressure tank 17 and equalizing tube 25 will produce a forced flow of liquid which, when delivered through a proper operating head, will produce a very fine spray. Moreover, when air is compressed to a high pressure in the pressure tank and equalizing tube, sufficient pressure will be rendered available for nearly or quite discharging all of the liquid contained in said pressure tank, but, of course, the pumping action may be repeated as often as found desirable, so as to keep up the best operative pressure and to keep the pressure tank well supplied with liquid.

With the described arrangement of the lower end of the delivery pipe 57 near one end of the pressure tank 17 and with the outlet nipple 59 near the lower portion of the opposite end of said tank, there is a strong tendency to keep sediment stirred up and prevented from settling at the bottom of said pressure tank and to work any sediment constantly toward the discharge nipple, so that it will not have a chance to settle. However, there will be but a comparatively small part of the incompletely dissolved solid substance that will be carried into the said pressure tank, but it is, nevertheless, highly important to prevent settling even of this small amount.

It will be noted that the tubular valve casing 28 is removable as an entirety with its valves from the base that connects the pump to the lower end of the equalizing tube or chamber. Also, it will be noted that the trussed bar 44 extends across the upper portion of the supply tank at one side of its diameter and at such distance therefrom that the pump cylinder 24 is located approximately concentric to the axis of the supply tank.

The valve unit construction of Figure 8 is extremely simple and can be cheaply manufactured and applied wherever needed. The element 38 provides means for anchoring the pumping apparatus and, as before stated, the flange 36 engages the element 23 when the projection 38 is engaged with said bowed element. It will be further noted that the downwardly concave face of the flange 36 permits communication with the passage 34, when the periphery of the flange engages the support, the margin or periphery of this flange being formed to permit entry of fluid as shown. This is a valuable feature of the invention because the pumping apparatus can be quickly withdrawn or introduced and properly fastened, with the intake element 38 properly positioned. The bowed element supports the intake 28 above the bottom so that sediment is not so readily drawn into the pumping apparatus.

The socketed casting 26 having the passage 27 connecting the sockets, along with a tubular member having a portion extending into one of the sockets and removably arranged as a valve unit is a valuable feature of the invention. It will be noted that the tubular member extends across the socket-connecting passage 27 and that its upper portion which fits in an opening in the bottom of the socket has the integral prongs 32 which enclose and limit the movement of the gravity operable ball valve 31. The arrangement of the valve 35 held in position by a removable element 36 gives a cheap compact two valve construction.

The arrangement of the pump rod relative to the cylinder 24 so that it can be withdrawn or disconnected on an exaggerated upward movement of the handle, and the arrangement of the agitator elements 47, 48 and 49 with reference to the pump rod and cylinder 25 for detachably guidingly sustaining the agitator, along with the arrangement to permit disengagement of the guiding means from the cylinder 25 during swinging of the pump rod after disengagement of its piston from its cylinder are all valuable features of the invention.

What I claim is:

1. A receptacle, an element arranged within the receptacle, a bracing element comprising members clampingly engageable with the element and having opposite ends opposed to the receptacle in a position to abut therewith, means for causing the member to clamp, the length of the members being such that during clamping they are elongated and exert an expanding pressure upon the sides of the receptacle.

2. A receptacle, an element arranged within the receptacle, a bracing element comprising members engageable with the element from opposite corresponding sides and having opposite ends connected together and to the receptacle, means for drawing the members together, the length of the members being such that when they are drawn toward one another to clampingly embrace the element, they are elongated and exert an expanding pressure upon the sides of the receptacle.

3. A device of the class described including a receptacle, a pumping device within the receptacle including a pump cylinder, a pump handle pivoted to the device, a pump rod pivoted to the handle and having a piston operated in the cylinder, an agitator device connected to the pump rod for movement in direction of pump rod motion, and including segments arranged at opposite sides of the device and partially circumscribing the same but with their terminals spaced to permit removal by motion in a direction other than parallel with the long axis of the device, said agitators being supported each by a leg connected to a bracket adjustably secured to the pump rod, the said bracket having arms which engage opposite sides of one of the cylinders to prevent rotative motion of the bracket on the rod.

4. A device of the class described including a receptacle, a pumping device within the receptacle including two parallel cylinders, a pump handle pivoted at the top of one of the cylinders, a pump rod pivoted to the handle and having a piston operated in the other cylinder, an agitator connected to the pump rod for movement in direction of pump rod motion, and including arcuate plate-like segments arranged at opposite sides of the cylinders and partially circumscribing both but with their terminals spaced to permit removal by motion in a direction other than parallel with the long axis of the cylinders, said agitators being supported each by a leg which is parallel with the cylinders and which is connected to a bracket adjustably secured to the pump rod, the said bracket having arms which engage opposite sides of one of the cylinders to prevent rotative motion of the bracket on the pump rod.

In testimony whereof I affix my signature.

ANTON W. KEGLER.